(12) United States Patent
Lemaitre

(10) Patent No.: US 10,247,843 B2
(45) Date of Patent: Apr. 2, 2019

(54) SYSTEM AND METHOD FOR MEASURING THE WIDTH OF A FAULT ON A SITE TO BE MONITORED

(71) Applicant: Office National D'Etudes et de Recherches Aerospatiales (ONERA), Palaiseau (FR)

(72) Inventor: Francois Lemaitre, Lauzerville (FR)

(73) Assignee: OFFICE NATIONAL D'ETUDES ET DE RECHERCHES AEROSPATIALES (ONERA), Palaiseau (FR)

( * ) Notice: Subject to any disclaimer, the term of this patent is extended or adjusted under 35 U.S.C. 154(b) by 318 days.

(21) Appl. No.: 15/100,968

(22) PCT Filed: Dec. 4, 2014

(86) PCT No.: PCT/EP2014/076525
§ 371 (c)(1),
(2) Date: Jun. 1, 2016

(87) PCT Pub. No.: WO2015/082591
PCT Pub. Date: Jun. 11, 2015

(65) Prior Publication Data
US 2016/0306064 A1 Oct. 20, 2016

(30) Foreign Application Priority Data
Dec. 4, 2013 (FR) .................................... 13 62120

(51) Int. Cl.
*G01V 3/12* (2006.01)
*G01V 1/00* (2006.01)
*H01Q 15/14* (2006.01)

(52) U.S. Cl.
CPC ............... *G01V 3/12* (2013.01); *G01V 1/008* (2013.01); *H01Q 15/14* (2013.01)

(58) Field of Classification Search
CPC ........... G01V 1/008; G01V 3/12; H01Q 15/14
USPC ........................................................ 342/28
See application file for complete search history.

(56) References Cited

U.S. PATENT DOCUMENTS

| 4,284,350 A | 8/1981 | Coon et al. |
| 5,112,130 A | 5/1992 | Isawa |
| 5,289,434 A | 2/1994 | Berni |
| 2015/0378088 A1* | 12/2015 | Stormberg ............... F21S 8/06 362/606 |

OTHER PUBLICATIONS

Search Report in French Application No. 1362120 and English translation coversheet. 3 pages.
Search Report in International Application No. PCT/EP2014/076525 and English translation coversheet. 3 pages.

* cited by examiner

*Primary Examiner* — Timothy A Brainard
(74) *Attorney, Agent, or Firm* — Womble Bond Dickinson (US) LLP

(57) ABSTRACT

The invention relates to the field of seismology and volcanology, especially the monitoring of the sites in question, called "unstable sites", and more specifically the monitoring of a fault on such a site. In this respect, the invention especially relates to a reflective assembly to be arranged on a monitored site, the site being monitored from an observation point from which an electromagnetic wave is directed towards the reflective assembly. The invention also relates to a method for monitoring a site by means of such a reflective assembly.

9 Claims, 2 Drawing Sheets

SYSTEM AND METHOD FOR MEASURING THE WIDTH OF A FAULT ON A SITE TO BE MONITORED

GENERAL TECHNICAL FIELD

The invention relates to the field of seismology and volcanology and especially the monitoring of sites known as "unstable sites" and more particularly the monitoring of a fault on such a site.

PRIOR ART

A site called "unstable" is a land area forming the object of modifications over time as to whether this area is natural or not, these modifications corresponding to largescale movements (cracking of the ground, for example), or whether they are localised over time or in some parts of the area (rockfalls, for example).

Conventionally, fibre optic rupture detectors or even units of wired distance meter type (extensometers, crackmeters, inclinometers, etc.) are used to monitor an unstable site.

However, these monitoring techniques are not very satisfactory, as they need all the points monitored on the site to be equipped with active devices.

GPS radio-localisation systems in differential configuration can also be used.

Here too these are active devices which need a local power source.

To rectify these disadvantages document EP 0 811 854 proposes a method and a device using radar waves associated with a reflecting assembly arranged on the unstable site to be monitored and especially for monitoring the spread of a fault (or else the movement of terrain or a work of art). Such an assembly comprises three reflecting elements to be placed on either side of the fault to be monitored including a plane mirror which must be oriented precisely to correctly reflect waves originating from the other reflecting elements.

But this technique does have disadvantages. It enables only transverse measuring of the movement of the fault and needs the reflecting elements to be precisely placed on either side of the fault to avoid orientation errors.

PRESENTATION OF THE INVENTION

The invention proposes to overcome the above disadvantages and for this reason, according to a first aspect, proposes a reflecting assembly designed to be arranged on a monitored site, said site being monitored from an observation point from which an electromagnetic wave is directed towards said reflecting assembly, the reflecting assembly comprising:

a first unit comprising a trihedral reflector and a dihedral deflector, said trihedral reflector comprising an apex;

a second unit comprising a first trihedral reflector comprising an apex;

the first and second units being arranged relative to each other so that the trihedral reflector of the first unit reflects towards the observation point an electromagnetic wave received from said observation point and so that the dihedral deflector deflects towards said observation point an electromagnetic wave originating from said observation point and received from the first trihedral reflector of the second unit after having been deflected towards said first trihedral reflector of the second unit by said dihedral deflector.

The reflecting assembly can comprise a second trihedral reflector comprising an apex, the second unit being adapted so that the second trihedral reflector reflects an incident electromagnetic wave received from an observation point, its direction of incidence directly.

According to a second aspect the invention proposes a method for monitoring a site by means of a reflecting assembly according to the first aspect of the invention, the method comprising the following steps:

transmission by means of a transmit/receive unit of electromagnetic waves arranged at an observation point from which the site is monitored, an electromagnetic wave towards the reflecting assembly;

acquisition, by the transmit/receive unit, of electromagnetic waves reflected by the first and second units;

processing of said waves acquired to deduce therefrom lengths of a first optical path and a second optical path;

determination, from the lengths of the resulting optical paths of a distance between the apex of the reflector of the first unit and the apex of the first reflector of the second unit, said distance being characteristic of the site to be monitored.

The method according to the second aspect of the invention is advantageously completed by the following characteristics, taken singly or in any one of their technically possible combinations:

a distance between an observation point and the apex of the reflector of the first unit is determined from the lengths of the optical paths;

the second unit comprising a second trihedral reflector comprising an apex, the acquired waves are processed to deduce therefrom the length of a third optical path to determine a distance between an observation point and the apex of the second reflector of the second unit;

the electromagnetic waves reflected by the first and second units are acquired at several instants by the transmit/receive unit so as to estimate a variation of at least one of the estimated distances and to deduce therefrom any movement of the monitored site;

the transmit/receive unit of electromagnetic waves is a monostatic radar and wherein to deduce therefrom at least one length of a first optical path and a length of a second optical path, the received radar echoes corresponding to the dimensions of the monitored site are sorted in their order of arrival, in a direction of observation of the monitored site and in an observation frequency band of the monitored site.

According to a third aspect, the invention relates to a monitoring system of a site comprising a reflecting assembly according to the first aspect of the invention, a transmit/receive unit of electromagnetic waves and a processing unit configured to execute a method according to the second aspect of the invention.

According to a fourth aspect, the invention relates to a computer program product comprising code instructions for executing a method according to the second aspect of the invention when the latter is executed by a processor.

There are many advantages of the invention.

It is possible to obtain simultaneous measurements in both the radial and normal directions of the fault from an observation point.

Furthermore, installation of the different elements on the site to be monitored is easy as the elements are compact, there are few of them and they are tolerant to orientation errors.

PRESENTATION OF FIGURES

Other characteristics, aims and advantages of the invention will emerge from the following description which is purely illustrative and non limiting and which must be considered in conjunction with the appended drawings, in which.

In all figures similar elements have identical reference numerals.

DETAILED DESCRIPTION OF THE INVENTION

It is specified here that "trihedral reflector" means a reflector comprising three plane surfaces, having forms which can be other than triangular, reflecting electromagnetic waves, orthogonal two by two and combined at a point called an apex.

The well-known technical effect of this type of trihedral reflector is reflecting an incident light beam towards its direction of arrival, irrespective of the angle of incidence of this light beam, which makes it robust relative to uncertainties of orientation. In the visible field, such a reflector is called retroreflector. By extension, the term trihedral reflector also covers retroreflectors as well as Luneberg lenses whereof the technical effect is the same.

Figure 1:
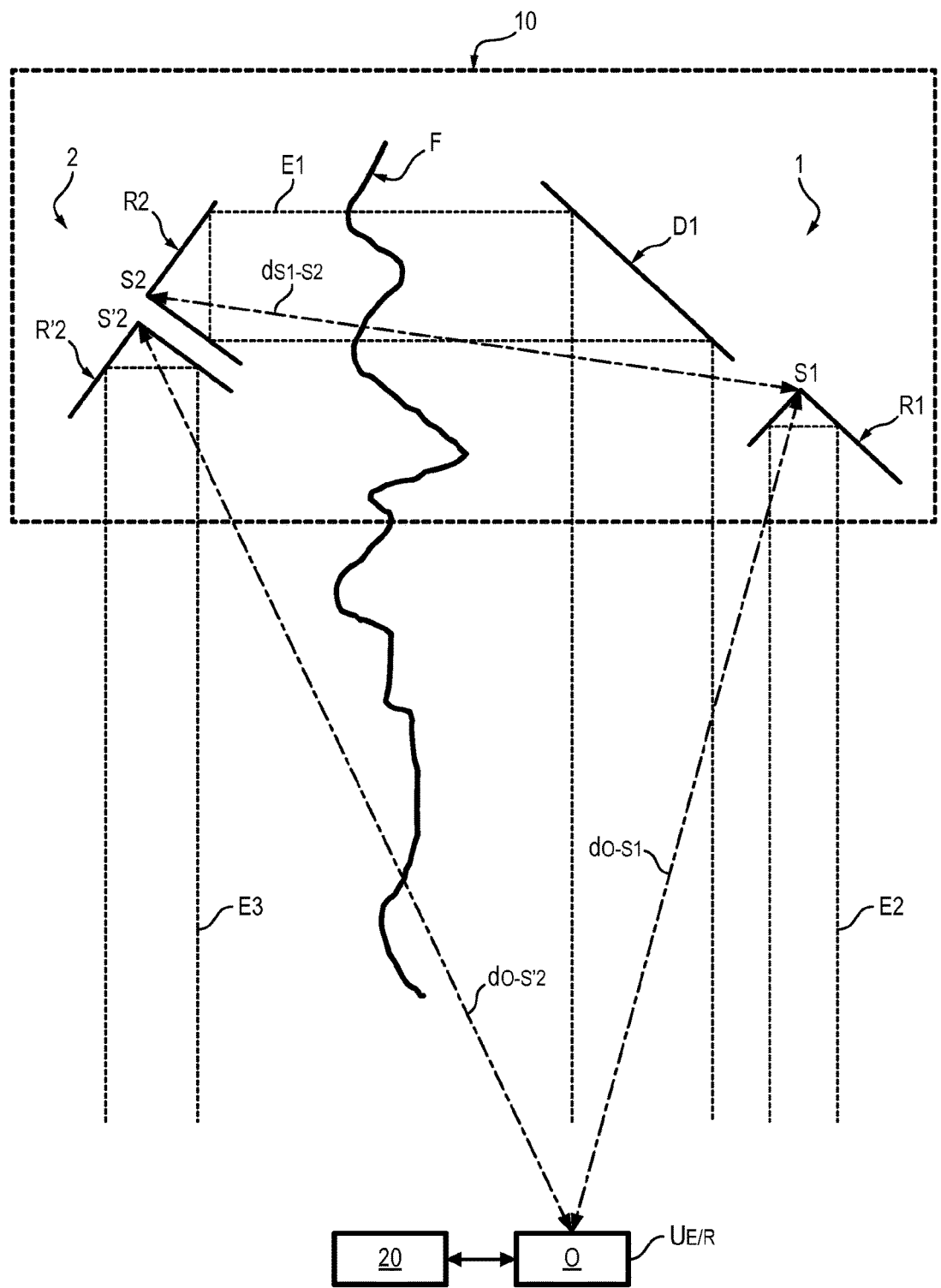
FIG. 1 illustrates monitoring of a site according to the invention.

FIG. 1 illustrates monitoring of a site according to the invention. In particular, the site comprises a fault F to be monitored by means of a monitoring system comprising a reflecting assembly 10 and a transmit/receive unit $U_{E/R}$ of electromagnetic waves. The reflecting assembly 10 is positioned on the unstable site to monitor the fault F (and especially the width of the fault F).

The reflecting assembly comprises a first unit 1 arranged to one side of the fault F and a second unit 2 arranged to the other side of the fault F.

The site is observed from an observation point O on which is arranged the transmit/receive unit $U_{E/R}$ of electromagnetic waves configured to transmit from an observation point O of the site an electromagnetic wave directed towards the reflecting assembly. It is specified that the observation point O can be different to the point from which the electromagnetic wave is transmitted.

The transmit/receive unit $U_{E/R}$ is preferably a monostatic radar. In particular, it is broadband transmission with a transmission frequency of the order of 22 GHz and bandwidth of the order of 8 GHz. It comprises one or more transmit and receive antennas with parabolic reflector. Each antenna has a gain of around 38 dB and an opening angle at 3 dB of the order of 1.7°. The field illuminated by the radar at 1 km has a diameter of around 30 m. A viewfinder is used for pointing the radar towards the site to be monitored.

The first unit 1 comprises a trihedral reflector R1 comprising an apex S1 and a dihedral deflector D1.

The second unit 2 comprises a first trihedral reflector R2 comprising an apex S2.

The apices of the trihedral reflector R1 of the first unit 1 and of the first trihedral reflector R2 of the second unit 2 are reference points, and are perfectly localised when the first 1 and second 2 units are arranged on the site to be monitored. In this way, the apices of the trihedral reflector R1 of the first unit 1 and of the first trihedral reflector R2 of the second unit 2 are positioned on either side of the fault F.

On either side of the fault F, the first 1 unit and the second unit 2 are configured so that the trihedral reflector R1 reflects directly towards the observation point O an electromagnetic wave which it receives and so that the dihedral deflector D1 of the first unit 1 deflects towards this observation point O a wave which it receives from the first reflector R2 of the second unit 2 after having deflected it towards the first reflector R2.

So, an electromagnetic wave originating from the transmit/receive unit $U_{E/R}$ directed towards the reflecting assembly 10 in return produces electromagnetic waves which have travelled the following optical paths.

A first optical path E1 is such that the wave originating from the transmit/receive unit $U_{E/R}$ is deflected by the dihedral deflector D1 towards the first reflector R2 of the second unit 2, which reflects the beam towards the dihedral deflector D1 so that it deflects it in turn towards the transmit/receive unit $U_{E/R}$.

A second optical path E2 is such that the wave originating from the transmit/receive unit $U_{E/R}$ is reflected by the trihedral reflector R1 towards the transmit/receive unit $U_{E/R}$.

Given that the positions of the dihedral deflector D1 and of the trihedral reflector R1 are known, the first and second optical paths E1, E2 produce the distance $d_{S1-S2}$ between the apex S1 of the reflector R1 of the first unit 1 and the apex S2 of the first reflector R2 of the second unit 2.

In the event where the first unit 1 and second unit 2 are placed such that the distance $d_{S1-S2}$ between the apex S1 of the reflector R1 of the first unit 1 and the apex S2 of the first reflector R2 of the second unit 2 is locally perpendicular to the fault F, and where the deformation of the site is a movement spreading apart the walls of the fault, measurement in variation of the distance $d_{S1-S2}$ between the apex S1 of the reflector R1 of the first unit 1 and the apex S2 of the first reflector R2 of the second unit 2 provides direct measuring of a variation in width of the fault F.

In other cases, estimating a variation in width of the fault F requires estimating on the one hand the radial component of this variation, that is, the component according to the direction of observation of the apex S1 of the trihedral reflector of the first unit (direction taken between the observation point O and the apex S1 of the trihedral reflector of the first unit 1) and on the other hand its transverse component, that is, according to a direction perpendicular to this direction of observation.

In addition, the reflecting assembly 10 is such that the second unit 2 comprises, apart from the first trihedral reflector R2, a second trihedral reflector R2' comprising an apex S2'.

Therefore, an electromagnetic wave originating from the transmit/receive unit $U_{E/R}$ directed towards the reflecting assembly 10 in return enables to produce electromagnetic waves which have travelled a third optical path E3, apart from the first E1 and second E2 optical paths, such that the wave originating from the transmit/receive unit $U_{E/R}$ is reflected by the second reflector R2' of the second unit 2 towards the transmit/receive unit $U_{E/R}$. The length of this third optical path E3 enables to obtain the distance between the observation point O and the apex S2' of the second reflector R2' of the second unit 2.

By means of the second trihedral reflector R2' of the second unit 2 it is possible to decompose a variation of the distance $d_{S1-S2}$ between the apex S1 of the trihedral reflector R1 of the first unit 1 and the apex S2 of the first reflector R2 of the second unit 2 on the one hand, into a radial variation of this distance $d_{S1-S2}$, this radial variation being calculated from the difference between the distances measured between the observation point O and the apex S1 of the trihedral reflector R1 of the first unit 1 $d_{O-S1}$ and between the observation point O and the apex S2 of the second reflector R2' of the second unit 2 $d_{O-S2'}$, and on the other hand, into a transverse variation of the distance $d_{S1-S2}$ between the apex S1 of the reflector R1 of the first unit 1 and the apex S2 of the first reflector R2 of the second unit 2, this transverse variation being calculated from the variation of the distance $d_{S1-S2}$ between the apex S1 of the reflector R1 of the first unit 1 and the apex S2' of the second reflector R2' of the second unit 2 and of the radial variation of this distance. Given the orientation of the distance between the apex S1 of the reflector R1 of the first unit 1 and of the apex S2 of the first reflector R2 of the second unit 2 relative to that of the fault, the addition of this second trihedral reflector therefore distinguishes a spreading of wall distance of the fault from a relative sliding of these walls.

Figure 2:
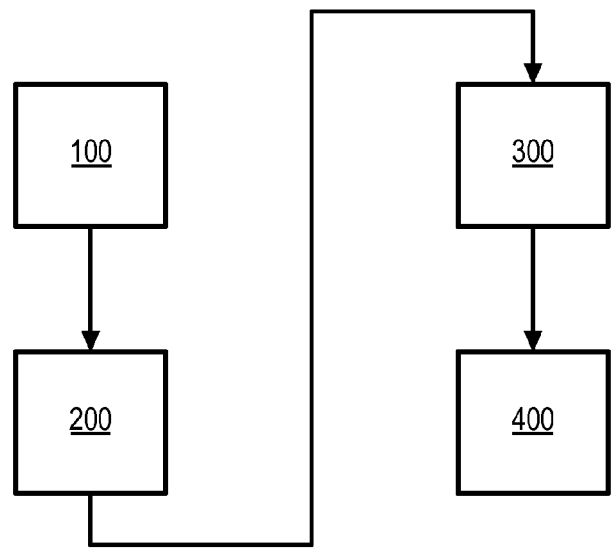
FIG. 2 illustrates steps of a method for monitoring a site according to the first or the second embodiment.

Apart from the reflecting assembly 10, the monitoring system comprises a processing unit 20 configured to execute a method for monitoring an unstable site described hereinbelow in relation to FIG. 2.

In a first step 100, an electromagnetic wave towards the reflecting assembly 1 from the transmit/receive unit $U_{E/R}$ is transmitted from the observation point O.

In a second step 200 the electromagnetic waves reflected by the first and second units are acquired by means of the transmit/receive unit $U_{E/R}$.

In a third step 300 the acquired waves are processed to deduce therefrom the lengths of the first and second optical paths E1 and E2.

Next, in a fourth step 400, the distance $d_{S1-S2}$ between the apex S1 of the reflector R1 of the first unit 1 and the apex S2 of the first reflector R2 of the second unit 2 are determined, this distance $d_{S1-S2}$ being characteristic of the site to be monitored, from on the one hand subtraction from the length of the first optical path E1 by the length of the second optical path E2 and from, on the other hand, the knowledge of the orientation relative to the direction of observation of the apex S1 of the reflector R1 of the first unit 1 and of the length of the straight segment between the apex S1 of the reflector R1 of the first unit 1 and the deflector D1 of the first unit 1.

Furthermore, if the second unit 2 comprises a second trihedral reflector R2' comprising an apex S2', during this fourth step 4 the distance $d_{O-S2'}$ between the observation point O and the apex S2' of the second reflector R2' of the second unit 2 can be estimated.

Advantageously, the distances obtained hereinabove are determined at several instants, the acquisition of electromagnetic waves occurring at several instants so as to estimate variations over time of distance(s) $d_{O-S1}$, $d_{S1-S2}$, $d_{O-S2'}$, $d_{O-S2}$, to deduce therefrom any movement of the monitored site.

In the event where the transmit/receive unit $U_{E/R}$ of electromagnetic waves is a monostatic radar, to deduce therefrom the different optical paths the radar echoes received are sorted in their order of arrival and given the positions of the different elements of the reflecting assembly it is possible to distinguish the different optical paths between them.

In particular, the first optical path E1, longer than the second E2 and third E3 optical paths, corresponds to a radar echo which will arrive after the others.

Hereinbelow is a description of the determination, in the event where the transmit/receive unit $U_{E/R}$ is a monostatic radar, of the distance between the observation point O and the apex S1 of the reflector of the first unit 1, or else between the observation point O and the apex S2' of the second reflector R2' of the second unit 2.

1) The distance of the reflector is marked roughly by analysing the signal received as a function of the delay relative to transmission. The precision is a length equivalent to the duration of the transmitted pulses (of the order of a few meters for pulses of a duration of the order of a few tens of nanoseconds).

2) Synthesised pulse response processing is carried out over all frequencies of the transmission band, which enables to produce for example a distance resolution (radial or transversal) of the order of 18 mm for a bandwidth of 8 GHz.

3) Hyperresolution processing is carried out, which enables to position the echo with increased precision which depends on the energy ratio of retrodiffused signals, by the reflectors, with local noise, the reflectors being dimensioned so that this ratio is big enough. This hyperresolution processing for example implements algorithms of PRONY or BURG type, classically known to the skilled person, which exploit dephasing between the lower and upper parts of the total spectrum used for synthesis of the pulse response. In the case of monostatic radar, this processing enables distance estimation precision of 1 to 2 mm.

4) The phase of the retrodiffused signal, which varies by 360° for a variation in distance by a semi-wavelength (6 mm), is then analysed. The latter processing further refines measuring (with however a limit linked to the signal/noise ratio) to finally attain distance estimation precision of 0.05 mm.

The invention claimed is:

1. A reflecting assembly (10) designed to be arranged on a monitored site, said site being monitored from an observation point (O) from which an electromagnetic wave is directed towards said reflecting assembly (10); the reflecting assembly (10) comprising:
  a first unit (1) comprising a trihedral reflector (R1) and a dihedral deflector (D1), said trihedral reflector (R1) comprising an apex (S1);
  a second unit (2) comprising a first trihedral reflector (R2) comprising an apex (S2);
  the first (1) and second (2) units being arranged relative to each other so that the trihedral reflector (R1) of the first unit (1) reflects towards the observation point (O) an electromagnetic wave received from said observation point (O) and so that the dihedral deflector (D1) deflects towards said observation point (O) an electromagnetic wave originating from said observation point (O) and received from the first trihedral reflector (R2) of the second unit (2) after having been deflected towards said first trihedral reflector (R2) of the second unit (2) by said dihedral deflector (D1).

2. The reflecting assembly according to claim 1, wherein the second unit (2) comprises a second trihedral reflector (R2') comprising an apex (S2'); the second unit (2) being adapted so that the second trihedral reflector (R2') reflects an incident electromagnetic wave received from an observation point, its direction of incidence directly.

3. A method for monitoring a site by means of a reflecting assembly (10) according to claim 1, the method comprising the following steps:
  transmission by means of a transmit/receive unit ($U_{E/R}$) of electromagnetic waves arranged at an observation point (O) from which the site is monitored, an electromagnetic wave towards the reflecting assembly (10);
  acquisition, by the transmit/receive unit ($U_{E/R}$), of electromagnetic waves reflected by the first and second units;
  processing of said waves acquired to deduce therefrom lengths of a first optical path (E1) and a second optical path (E2);

determination, from the lengths of the resulting optical paths (E1, E2), of a distance ($d_{S1-S2}$) between the apex (S1) of the reflector (R1) of the first unit (1) and the apex (S2) of the first reflector (R2) of the second unit (2), said distance being characteristic of the site to be monitored.

4. The method according to claim 3, wherein a distance ($d_{O-S1}$) between an observation point (O) and the apex (S1) of the reflector (R1) of the first unit (1) is determined from the lengths of the optical paths (E1, E2).

5. The method according to claim 3, wherein, the second unit (2) comprising a second trihedral reflector (R2') comprising an apex (S2'), the acquired waves are processed to deduce therefrom the length of a third optical path (E3) to determine a distance ($d_{O-S2'}$) between an observation point and the apex (S2') of the second reflector (R2') of the second unit (2).

6. The method according to claim 3, wherein the electromagnetic waves reflected by the first and second units are acquired at several instants by the transmit/receive unit ($U_{E/R}$) so as to estimate a variation of at least one of the determined distances ($d_{O-S1}$, $d_{S1-S2}$, $d_{O-S2'}$, $d_{O-S2}$) and to deduce therefrom any movement of the monitored site.

7. The method according to claim 3, wherein the transmit/receive unit ($U_{E/R}$) of electromagnetic waves is a monostatic radar and wherein to deduce therefrom at least one length of a first optical path (E1) and a length of a second optical path (E2), the received radar echoes corresponding to the dimensions of the monitored site are sorted in their order of arrival, in a direction of observation of the monitored site and in an observation frequency band of the monitored site.

8. A system for monitoring a site comprising a reflecting assembly (10) according to one of claim 1; a transmit/receive unit ($U_{E/R}$) of electromagnetic waves; and a processing unit (20) configured to execute a method comprising:

transmission by means of a transmit/receive unit ($U_{E/R}$) of electromagnetic waves arranged at an observation point (O) from which the site is monitored, an electromagnetic wave towards the reflecting assembly (10);

acquisition, by the transmit/receive unit ($U_{E/R}$), of electromagnetic waves reflected by the first and second units;

processing of said waves acquired to deduce therefrom lengths of a first optical path (E1) and a second optical path (E2);

determination, from the lengths of the resulting optical paths (E1, E2), of a distance ($d_{S1-S2}$) between the apex (S1) of the reflector (R1) of the first unit (1) and the apex (S2) of the first reflector (R2) of the second unit (2), said distance being characteristic of the site to be monitored.

9. A computer program product comprising non-transitory code instructions for executing the method according to the system of claim 8 when the code is executed by a processor.

* * * * *